United States Patent [19]
Rieser et al.

[11] 3,881,043
[45] Apr. 29, 1975

[54] LAMINATED SAFETY WINDSHIELDS

[75] Inventors: Raymond G. Rieser, Lower Burrell; Joseph Chabal, Curtisville, all of Pa.

[73] Assignee: PPG Industries, Inc., Pittsburgh, Pa.

[22] Filed: Sept. 10, 1973

[21] Appl. No.: 395,485

Related U.S. Application Data

[63] Continuation-in-part of Ser. No. 246,016, April 20, 1972, which is a continuation-in-part of Ser. No. 185,627, Oct. 1, 1971, abandoned.

[52] U.S. Cl. .................. 428/81; 428/194; 52/171; 156/99
[51] Int. Cl. ..................... B32b 17/10; B32b 27/40
[58] Field of Search ........... 161/190, 192, 194, 147, 161/148, 193, 188; 156/99, 106; 52/171

[56] References Cited
UNITED STATES PATENTS

| | | | |
|---|---|---|---|
| 2,640,987 | 6/1953 | Ehlers | 161/148 |
| 2,773,791 | 12/1956 | MacIver | 161/148 X |
| 3,445,423 | 5/1969 | Sunshine et al. | 161/190 X |
| 3,505,160 | 4/1970 | Michaels et al. | 161/190 X |
| 3,522,142 | 7/1970 | Wismer et al. | 161/190 |
| 3,791,914 | 2/1974 | Ammons | 161/190 |
| 3,808,077 | 4/1974 | Rieser et al. | 161/192 |
| 3,808,088 | 4/1974 | Knechtges | 161/148 |

*Primary Examiner*—Harold Ansher
*Attorney, Agent, or Firm*—Edward I. Mates

[57] ABSTRACT

Safety glass windshields consisting essentially of polyurethane sheets laminated between moisture impervious sheets, such as glass, tend to separate. This separation has been discovered to be related to absorption of moisture in the polyurethane sheets along the exposed portion over an increasingly wider margin extending inward from the exposed surface during the time that the laminated glass-polyurethane window has its peripheral portion exposed until such time that its marginal portion is protected from exposure to atmospheric moisture when the windshield is installed with its marginal portion in a moisture impervious frame when assembled within an automobile or other vehicle. Bilayer windshields consisting essentially of a single glass sheet laminated to a polyurethane sheet also tend to delaminate on exposure to moisture. The present invention provides an adhesion promoting composition, such as a coupling agent, to a selected portion of the interface between glass and polyurethane to prevent separation of the windshield components. Care is taken to limit the proportion of the area of the interface treated with the adhesion promoting compositioin to control the overall adhesion of polyurethane to glass to a range in which the laminated windshield has an acceptable resistance to penetration, an acceptable lacerative injury rating and an acceptable Severity Index rating.

15 Claims, 5 Drawing Figures

LAMINATED SAFETY WINDSHIELDS

RELATION TO OTHER APPLICATIONS

The present application is a continuation-in-part of application Ser. No. 246,016 of Raymond G. Rieser and Joseph Chabal, filed Apr. 20, 1972. The latter, in turn, is a continuation-in-part of application Ser. No. 185,627 of Raymond G. Rieser and Joseph Chabal, filed Oct. 1, 1971, now abandoned.

BACKGROUND OF THE INVENTION

This invention relates to improvements in transparent laminated windows composed of at least one sheet of a rigid transparent material such as glass and a polyurethane layer and means for improving the safety of such laminated windows. While the discussion in this specification will deal mainly with glass-polyurethane laminated safety windows containing one or more glass sheets, it is understood that the present invention may find applications where one or more glass sheets is replaced with a transparent sheet of other material more rigid than polyurethane, such as polycarbonate, acrylic and polyester resins.

Safety glass windows used as windshields in automobiles are presently composed of two glass sheets from about 60 to 150 mils thick (preferably 90 to 120 mils) and an interlayer of plasticized polyvinyl butyral from about 10 to 60 mils thick, generally 30 mils thick, laminated between the two glass sheets.

Laminated glass is presently employed as a glazing material in the windshields of automobiles, trucks, and other vehicles because it decreases the possibility that passengers carried in such vehicles will be seriously injured by the windshield or particles thereof if an accident occurs. Laminated glass consists of two or more sheets of glass bonded together by means of an elastomeric interlayer material. Polyurethane is commonly used as the interlayer because it can be adhered to glass when subjected to suitable temperatures and pressure, because it is transparent when bonded between two sheets of glass, and because of its resistance to elongation and tearing whenever an object impacts such a laminated glazing. The polyurethane compositions are sometimes introduced as partial polymers, sometimes cast in place, and sometimes introduced as a preformed sheet.

For purposes of discussion, the term "interlayer" will be employed to describe the elastomeric material positioned between the plies of glass whether such material is initially positioned therebetween as a single sheet or layer of elastomer or as several sheets or layers of elastomer. It is also contemplated that the interlayer may be formed by casting a liquid resin between the glass sheets and curing the resin in situ by heating the assembly until a good bond is obtained.

Laminated windshields offer two primary safety advantages. In the event of an accident, the bond which is effected between the glass and the interlayer will hold the glass particles in the same relative position, thereby preventing the possibility of injury as a result of flying glass. Holding the glass particles in the same relative position also limits the possibility of having the sharp edges of the broken glass exposed.

The other advantage is due to the physical properties of the elastomer. Unlike glass and other rigid materials, an elastomer will stretch prior to rupture rather than break immediately when subject to impact. When impacted, an elastomer will elongate, thereby absorbing energy from the impacting object and reducing the velocity of the impacting object. In many instances the velocity of the impacting object can be reduced to zero before the object penetrates the elastomer.

When polyurethane is employed as an interlayer material between glass sheets, such a laminate retains some of the elastomeric properties of the polyurethane. Thus, when impacted, a windshield consisting of two sheets of glass bonded together by means of a polyurethane interlayer will elongate in the immediate area of impact, thereby absorbing energy from the object and reducing its velocity. This property of a laminated windshield will be referred to as penetration resistance for the purpose of describing the present invention.

Penetration resistance is particularly desirable in a windshield because it serves to contain passengers within the vehicle when they are thrown against and fracture the windshield. Moreover, such penetration resistance also diminishes the probability of passengers being severely lacerated by "neck ruffle" resulting from partial penetration.

"Neck ruffle" is a term used to describe the periphery of a hole in a windshield resulting from penetration. In a conventional windshield, the "neck ruffle" consists of a number of sharp and jagged glass edges inclined at such an angle that they are capable of inflicting severe lacerations. This "neck ruffle" could, of course, inflict fatal wounds to a passenger of a vehicle who is thrown against the windshield with sufficient force to penetrate and then have his face or throat come to rest on the sharp and jagged glass edges.

It has been found that the degrees of adhesion required to produce the desired level of penetration resistance and to retain glass particles when the windshield is fractured are, to a certain degree, opposing in nature rather than complementary. That is, the ability of the interlayer to retain glass particles increases with the degree of adhesion effected during the laminating operation, whereas the penetration resistance is inversely related to an increase in adhesion. The reason for this is believed to be that the greater the adhesion is at the interfaces between the interlayer and the glass, the more likely it is that the interlayer material will separate along the cracks formed in the glass whenever the laminar structure is fractured. That is, with a high degree of adhesion, the glass restricts the interlayer from stretching as much and absorbing a portion of the impacting energy.

On the other hand, if the adhesive force between the glass and interlayer surfaces is not too great, whenever the laminar structure is fractured, it permits the interlayer to react more independently from the glass. This lesser degree of adhesion thus permits the interlayer to absorb a greater amount of the impacting energy before the impacting object penetrates the laminated structure.

It thus appears that for safety purposes, notwithstanding the fact that safety is dependent upon the specific type of accident involved, there is an optimum degree of interfacial bonding in a laminated windshield to satisfy both the need to retain glass particles from flying and to contain passengers within the vehicle whenever an accident occurs.

Other safety advantages are also obtained through the use of laminated windshields. For example, when an object is propelled against the outer surface of the windshield at sufficient velocity to break the outer sheet of glass, the interlayer and inner sheet of glass may remain intact, permitting the vehicle to be driven until such time as replacement of the windshield may be convenient. Breakage of this nature sometimes occurs when a speeding or passing vehicle propels a stone or other object on the surface of the road against the windshield. With a laminated windshield, damage resulting from this type of breakage is usually limited to one or more cracks in the outer sheet of glass originating at the point of impact and extending to the edge of the windshield.

Unfortunately, if the impacting object is small and has sufficient momentum, the force of the impact may be transmitted through the interlayer to the inner sheet of glass and cause fragments of the inner glass sheet to break loose and be propelled toward the interior of the vehicle. This type of breakage is frequently referred to as "spalling." It results from an instantaneous concentration of force on a relatively small area of one surface of a glass sheet.

Because of the present high rate of vehicle accidents and the injuries resulting therefrom, several efforts have been made to provide a safer windshield.

One approach consists of increasing the thickness of the interlayer material and controlling the degree of adhesion between the glass and interlayer interfaces during lamination to render the interlayer capable of increased resistance to penetration. The benefits obtained from increased interlayer thickness and controlled adhesion have been so promising that recently interlayers 0.030 inch thick in laminated windshields of automobiles have replaced the previously used interlayers 0.015 inch thick.

The attempts at improving the strength properties of safety-glass laminates by controlling the adhesion of the polyvinyl butyral interlayer to the glass have their limitations, particularly at low temperatures experienced in the colder seasons of the year. When a safety-glass laminate is struck with a blunt object, the breakthrough strength of the laminate is principally controlled by the strength of the interlayer and its ability to absorb the energy of the impact. When an impact is suffered by a safety-glass laminate in which the glass adheres too tenaciously to the interlayer, the amount of interlayer between cracks in the glass becomes small and is not as capable of absorbing the impact energy as when an interlayer having somewhat reduced adhesion to the glass is used which results in the formation of larger areas between cracks in the glass and the availability of a larger amount of interlayer to absorb the energy of the impact. However, the adhesion of the interlayer to the glass must not be reduced to the point where chunks of glass come loose from the interlayer when the laminate suffers an impact.

The need to improve the penetration resistance of laminated windshields has led to a study of polyurethane resins as a candidate for an interlayer material and also to a study of bilayer windshields containing a single sheet of glass and a single layer of polyurethane. Unfortunately, polyurethane resins are generally more difficult to adhere to glass than polyvinyl butyral, and presently known adhesive promoting compositions e.g., those commonly termed coupling agents, improve the adhesion of polyurethane to glass to such an extent as to cause the bond between the glass and polyurethane to be so great that the laminate separates along cracks formed in the glass rather than permitting the interlayer to react independently of the glass as it does when the glass-interlayer adhesion level is less. Thus, a laminated glass-plastic windshield with high interfacial adhesion has poor resistance to impact and other unsafe characteristics discussed earlier.

Furthermore, when a laminated window containing a polyurethane interlayer between two sheets of glass has its edge exposed to high humidity conditions, the polyurethane layer delaminates from the glass. When a bilayer windshield containing a single layer of glass bonded to a layer of polyurethane is exposed to high humidity conditions, delamination is even more rapid. It is known to use certain organic silicon compounds as an adhesion promotion composition or coupling agent at each interface between the polyurethane layer and a glass sheet of the laminated window to prevent such delamination on exposure to high humidity conditions. Unfortunately, the presence of the adhesion promoting composition over the entire extent of each interface between the polyurethane layer and each glass sheet as proposed in the prior art renders the laminated window unsafe. To the best of our knowledge, there was no adequate solution for this dilemma prior to the present invention.

Extensive experimental data have shown that bilayer windshield configurations (that is, those containing a single sheet of glass laminated to a single layer of polyurethane resin and omitting the inner sheet of glass of more conventional trilayer safety glass windshields) have better penetration resistance than the trilayer laminated windshields with two sheets of glass and a polyurethane or polyvinyl butyral interlayer. However, the problem of maintaining an adequate adhesion level between the layers of the bilayer windshield that is within the safe range is more difficult than with a trilayer windshield because the polyurethane layer of a bilayer windshield is exposed throughout its extent to changes in humidity conditions that affect the adhesion of polyurethane to glass, whereas in trilayer windshield configurations, each layer of glass serves as a moisture impervious barrier to protect the major surfaces of the polyurethane interlayer from conditions that weaken its adhesion properties. In trilayer windshields, it is only necessary to seal the marginal periphery with a material that serves as a moisture barrier.

TESTS USED FOR LAMINATED GLASS

Several tests used to evaluate safety glass laminates in the past will be described as background for evaluation of the novel laminates of the present invention.

1. Peel adhesion test

A convenient test for measuring the adhesion of safety-glass interlayers to glass is known as the peel adhesion test. This test comprises laminating a 6 inch by 12 inch sheet of interlayer material 30 mils thick sandwiched between two sheets of glass 6 inches wide, and 12 inches long under conventional conditions except that a 5 mil film of polyethylene glycol terephthalate, sold as "Mylar" (registered trademark of E. I. du Pont de Nemours & Co., Inc.) is interposed between the interlayer material and one of the sheets of glass and a thin metal screen is inserted between the interlayer material and the "Mylar" to bond to the surface of the interlayer material facing the "Mylar" during lamination. The construction is laminated in an oil autoclave under 200 psi pressure at 275°F. for 45 minutes. After the lamination operation, the laminate is cut into strips 6 by 1 inch and the "Mylar" and the glass adjacent the "Mylar" are removed. Then the film of interlayer material is peeled back from one of the ends of the remaining glass sheet and the amount of pull at 90° necessary to part it from the glass measured, using an "Instron" tensile testing machine. The adhesion is reported as pounds per inch at a thickness of 30 mils.

Conventional polyvinyl butyral sheets 30 mils thick having 22–23 percent hydroxyl groups calculated as weight percent vinyl alcohol requires a force of about 20 pounds per inch to peel it away from the glass in the above test. A peel adhesion value of about 2 to 10 pounds per inch is considered ideal for 30 mil polyurethane sheets, but peel adhesion values up to about 30 pounds per inch are acceptable under certain conditions. A piece of safety glass formed with a polyurethane interlayer having an adhesion to glass of below about 2 pounds per inch as defined in the above test will permit pieces of glass to fly out when the laminate is shattered by impact. Marked increase in the strength of safety-glass laminates is observed when the polyurethane to glass adhesion is controlled within the 2 to 30 pounds per inch range in the above defined test.

2. Impact Resistance

A method for determining the impact resistance of safety-glass laminates is known as the 5 pound ball impact test. A set of 10 12 inch square laminates consisting of two pieces of ⅛ inch thick plate glass and the 30 mil thick interlayer to be tested are prepared in the normal fashion. Each laminate is in turn laid on a horizontal steel frame which supports it by the outer one inch along all four edges. A hold-down frame, 12 inches by 12 inches outside and 1 inch wide made from steel and weighing about 6 pounds is clamped on top of the supported laminate in line with the other steel frame. A 5 pound solid steel ball is then dropped on the supported laminate so that it strikes within 1 inch of the center. If the ball does not pass through the laminate, the result is considered a support, and if the ball passes through the laminate, the latter is considered a failure. The drop height is increased or decreased one foot for the next laminate according to whether the last laminate is graded, respectively, a support or a failure. Testing is continued until the ball has been dropped on all 10 laminates and the 50 percent support height is calculated by the well-known "staircase" method.

The velocity of a ball dropped from the 50 percent support height is readily calculated at the point of impact by reference to the well known constant of the acceleration due to gravity.

More recently, a new and different way of determining the impact resistance of safety-glass laminates has been developed using a so-called Residual Energy Analyzer, some results from which will be in data reported later. The Residual Energy Analyzer comprises an electronic timer and two sensors disposed directly below the position defined by the pair of steel frames and occupied by the laminate to be tested in the path taken by the five pound ball. Each sensor comprises an insulated ring to which are mounted six fine wires directed radially inward. The falling ball, made of steel, shorts two wires when it passes through the upper sensor, thus activating the timer. When the ball passes through the lower sensor, it deactivates the timer. The transit time ($t$) of the ball as it drops between the two sensors, the drop height ($h_1$) of the ball from its initial position to the plane of impact with the test laminate, the vertical distance from the laminate to the upper sensor ($h_2$) and the vertical distance between the sensors ($h_3$) constitute the raw data from which the penetration energy (⊔) is calculated from the formula:

$$\sqcup = mg \left( h_1 + h_2 + \frac{h_3}{2} - \frac{h_3^2}{2gt^2} - \frac{gt^2}{8} \right)$$

where $m$ is the mass of the ball and $g$ is the acceleration of gravity. The ball must be dropped a height sufficient to insure its passage through the test laminate. Laminates identical in construction to those having a mean break height of 20 feet as determined by the older "staircase" technique produced readings of 21.62 feet when determined from a drop height of 25 feet and 20.71 feet when determined from a drop height of 30 feet. These results indicate good correlation between the older and newer methods of determining means break height (or mean penetration velocity). Since the newer method requires fewer specimens to be broken for a statistically valid test, it has been used often recently. Test results from the newer technique are recited as REA Penetration Velocity and recorded in miles per hour in the tables of test results reported later.

3. Severity Index

The Severity Index is a measure of the deceleration forces imposed on a motor vehicle passenger's head on impact with, for example, the windshield. There are two generally used techniques for measuring the Severity Index, the sled test and 22-pound freely-falling headform test.

The sled test is described in detail in the following references: "Human Tolerance to Impact Conditions as Related to Motor Vehicle Design" by the Society of Automotive Engineers Handbook Supplement J885, 1964; and "Use of a Weighted-Impulse Criteria for Estimating Injury Hazard" by J. P. Danforth and C. W. Gadd from the conference proceedings 10th Stapp Car Crash Conference reprinted by the Society for Automotive Engineers, December 1966. Briefly, the sled test for determining Severity Index consists of propelling a dummy of average height, 5 ft. 9 inc., and weight, 163 pounds (referred to as the 50th percentile Alderson dummy) at a preselected speed into a laminated safety glass closure, usually a windshield. The dummy is seated in an automobile seat which is mounted on a sled. The sled is propelled pneumatically and after being accelerated to the desired impact speed, the sled is brought to a sudden stop by a hydraulic decelerating cylinder positioned immediately before a mounted windshield. When the sled stops, the dummy is propelled by inertia into the windshield. Impact occurs at about 5 to 6 inches below the upper mounting in the plane of the glass which has been found to be the impact area in most automobile accidents. The windshield being tested is mounted in a standard windshield frame above the path along which the sled travels. The angle of mounting and adhesive glazing are similar to domestic, commercial production automobile windshield mountings.

To measure the deceleration forces on the dummy's head upon impact, biaxial accelerometers are mounted immediately behind the forehead area. The accelerometers measure the deceleration forces in "g's" (32 feet per second per second) as a function of time. The measurements are conventionally plotted graphically with the deceleration forces being plotted as the ordinate and the time in milliseconds being plotted as the abscissa. The Severity Index (S.I.) is calculated from such a plot using the Danforth-Gadd Equation by summing up the deceleration forces in "g's" with relation to time:

$$S.I. = \int_0^t g^{2.5} dt$$

Thus, the Severity Index can be calculated from the area under the curve resulting from the plot of deceleration forces acting on the dummy's head as a function of time. A severity Index of 1,000 has been suggested as the concussive injury threshold for head impacts. The Severity Index generally increases with velocity of impact.

The 22-pound freely-falling headform test is described in detail in a paper entitled "Laboratory Studies on Laminated Safety Glass and Installations on Performance" by R. G. Rieser and J. Chabal presented at the 13th Stapp Car Crash Conference, reprinted by the Society for Automotive Engineers, December 1969. Briefly, the test comprises dropping a 22-pound headform onto a 24 inch × 36 inch test laminate from various heights. The angle of impact can be varied but generally is 90°. The test laminates are supported by clamping them to a suitable frame. The measurement of the deceleration forces on the headform upon impact is determined as generally described above for the sled test in that a linear accelerometer is mounted in the headform, and the vertical deceleration forces in "g's" is measured as a function of time. The Severity Index is calculated plotting the deceleration force against time and integrating using the Danforth-Gadd Equation.

4. LACERATIVE INJURY RATING

Lacerative injury potential of a motor vehicle closure can be determined in the above-described sled test and in the 22-pound freely-falling headform test. To measure lacerative injury, the head of the dummy is covered with a double layer of chamois or goat skin. After the dummy's head has impacted the test laminate, the extent of damage to the chamois or goat skin is noted. Based on chamois or goat skin damage, lacerative injury is rated as is shown in the following table of lacerative injury rating:

Lacerative Injury Rating

| Rating | Damage to Chamois or Goat Skin |
| --- | --- |
| 1 | shallow scratches |
| 2 | few shallow cuts—top layer only |
| 3 | cuts and gouges of top layer |
| 4 | many cuts and gouges—few through both layers |
| 5 | extensive cuts and gouges to both layers |

DESCRIPTION OF THE PRIOR ART

U.S. Pat. No. 3,505,160 to George E. Michaels and Raymond G. Rieser discloses a glass-plastic laminate in which the marginal edge frame portion has a strong adhesion to glass and means is provided to reduce the adhesion between adjacent plies in an area intermediate the marginal edge portion. The laminated windshield disclosed in the Michaels et al patent comprises an interlayer having an effective adhesion to glass so great that it would normally provide an unsafe windshield when impacted by the head of an occupant of the vehicle. The intermediate portion of the windshield where impact is likely to take place is rendered safer by reducing the adhesion between adjacent plies. However, there is no teaching in the Michaels et al patent of treating the marginal edge portion or any other selected portion of the interfacial surface to increase adhesion locally.

U.S. Pat. No. 3,445,423 to Sunshine et al discloses using a 2 percent solution in ethanol of gamma-aminopropyl-triethoxysilane as an adhesion-enhancing primer for bonding the marginal portion of an automobile windshield to a metal windshield receiving member. The treatment is proposed for an external glass surface rather than an internal glass surface of a laminated windshield. This patent also suggests using a primer to bond two sheets of glass to each other using a polyurethane interlayer. There is no teaching in this patent of priming only selected portions of an interface between a glass sheet and the polyurethane interlayer.

SUMMARY OF THE INVENTION

The present invention provides glass-polyurethane laminates with increased adhesion in a selected portion of the interface. One aspect comprises a peripheral edge treatment in which interfacial surfaces between each ply are primed in a selected portion only with an adhesion promoting composition or coupling agent, preferably an organic silicon composition such as a silane. Preferably, the latter is applied around the entire margin of each glass sheet before assembling the glass sheets with the surface containing the adhesion promoting composition thereon in facing relation to the preformed sheet of polyurethane which is sandwiched between the glass sheets for the laminating operation. The assembly is laminated under elevated temperature and pressure conditions with the adhesion promoting composition disposed where it is applied. The resulting laminated window does not delaminate in its edge portion as has been the case in windows fabricated without the adhesion promoting composition.

The adhesion between the glass and the plastic around the marginal edges of the bilayer laminate is preferably greater than the adhesion in the interior of the laminate. Higher adhesion at the periphery prevents moisture penetration from the edge of the laminate which can seriously weaken the glass-plastic laminate bond. Also high peripheral adhesion insures against delamination caused by twisting of the glazing opening which occurs when the motor vehicle hits a bump or when the vehicle is jacked up. Furthermore, high peripheral adhesion is very important in a bilayer window where the inner plastic ply is partially secured to the frame by the peripheral glass-plastic laminate bond. The bond strength of the glass-plastic laminate around its periphery should be about 100 to 200, preferably 150 to 200, pounds per lineal inch. This compares with an average bond strength within the periphery of 2 to 30 pounds per linear inch.

In the case of bilayer windshields, the adhesion promoting composition is applied in a pattern of dots throughout the extent of the interfacial surface as well as in the marginal portion. The pattern of areas of high adhesion spaced by areas of low adhesion gives an overall effect in the area of likely impact similar to that obtained with a material having a uniform adhesion within the range acceptable for a safe windshield at the interface. Furthermore, the adhesive promoting composition or coupling agent applied in a dot pattern is of a material that retains good adhesion between glass and polyurethane even under high humidity conditions.

BRIEF DESCRIPTION OF THE DRAWINGS

A typical embodiment of the present invention will now be described in order to enable the reader to better understand the principles of the present invention. In the drawings, which form part of the present description.

DESCRIPTION OF THE PREFERRED EMBODIMENTS

Figure 1:
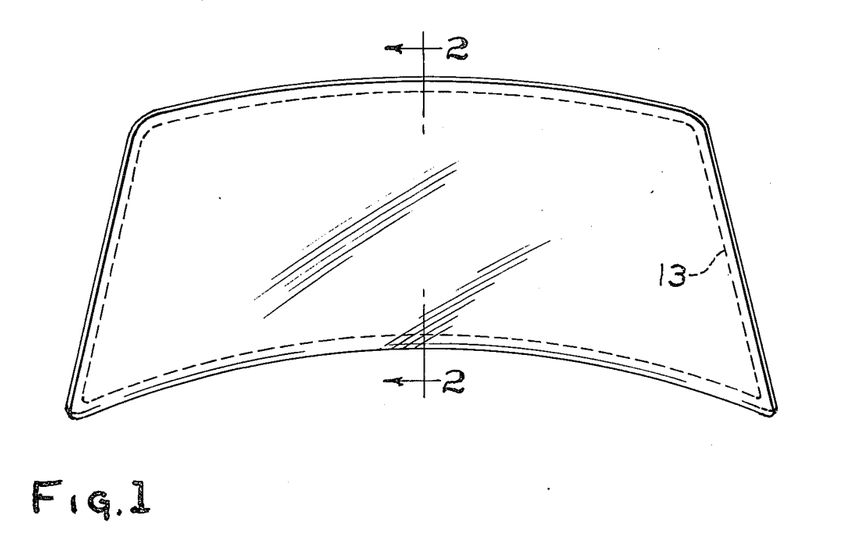
FIG. 1 is a front view of a curved laminated automobile windshield which may be either a trilayer or bilayer windshield treated in accordance with the teachings of one embodiment of the present invention.
Figure 2:
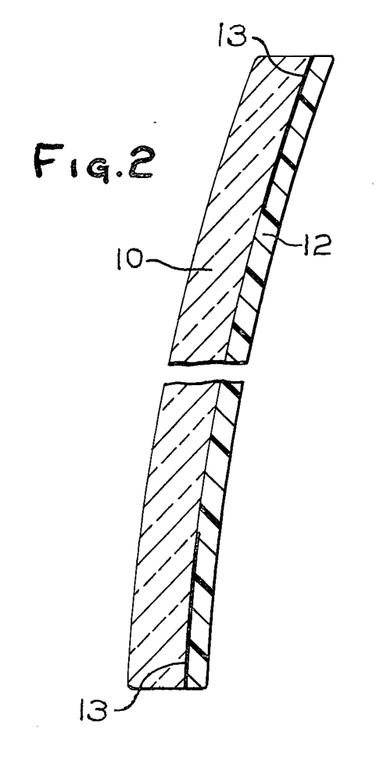
FIGS. 2 and 3 are fragmentary, enlarged, cross-sectional views of a bilayer and trilayer windshield taken along the lines 2—2 of FIG. 1.
Figure 3:
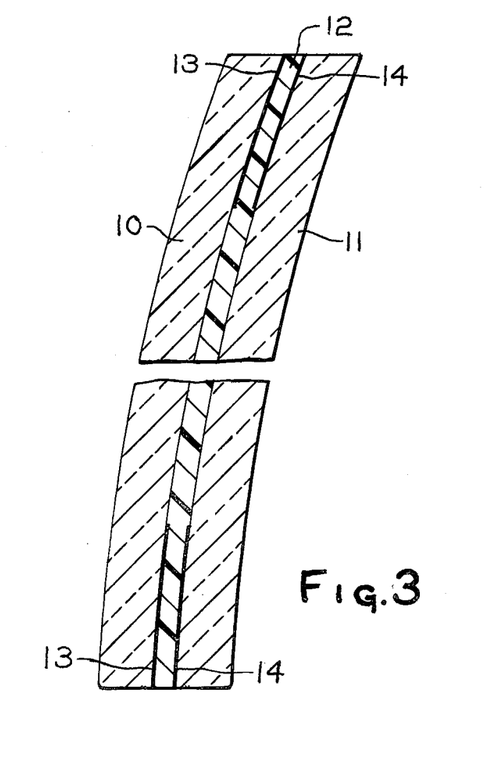

With reference to FIGS. 1 and 3 of the drawings, a laminated trilayer windshield comprises an outer glass sheet 10 at the outer convex side of the windshield and an inner glass sheet 12 at the inner concave side of the windshield. The glass sheets are preferably of commercial float glass of the soda-lime-silica type and have a thickness in the range of 60 to 150 mils. A polyurethane interlayer 12 made of a preformed sheet of polyurethane preferably of the type described later, having a thickness of 15 to 60 mils, is disposed between the two glass sheets. A border of an adhesion promoting composition or coupling agent (to be discussed later) 13 is disposed between glass sheet 10 and interlayer 12 around the entire marginal portion only of the windshield. An additional border 14 of an adhesion promoter or coupling agent is disposed between the entire marginal portion only of the inner glass sheet 11 and the polyurethane interlayer 12. In case the windshield is a bilayer windshield, the inner glass sheet 11 and the additional border is omitted as shown in FIG. 2.

According to a preferred form of the present invention, each border of adhesion promoting composition or coupling agent is approximately ½ inch to 2 inches wide and is preferably applied to the marginal edge of each glass sheet that is to be assembled to face the polyurethane interlayer 12. Generally a suitable material for an adhesion promoting composition or coupling agent is preferably an alkoxy silane, which is applied by wiping with a swab impregnated with a solution of said adhesion promoting composition or coupling agent and allowed to dry for a few minutes in the controlled atmosphere of the assembly room, which is preferably approximately 70°F. and no more than approximately 20 percent relative humidity.

The peripherally coated glass sheets are then assembled as sandwiches with the preformed sheet of polyurethane resin disposed between the two plies of glass in the orientation required for the ultimate trilayer windshield and the assembly is then laminated, preferably using a laminating technique of the type disclosed in U.S. Pat. No. 2,948,645 to L. A. Keim.

In this technique, the assembled sandwich is prepressed by enclosing its margin within a flexible channel shaped member that forms an evacuation conduit. Vacuum is applied to the conduit to remove air and other fluid from the interfacial surfaces of the assembly, first at room temperature and then at a higher temperature sufficient to adhere the resin to the glass, particularly in its marginal portion. The channel shaped member is removed and the assembly subjected to elevated temperatures and pressure in an autoclave for sufficient time to complete the lamination (e.g., 275°F. to 300°F. at 200 psi for 45 minutes). For simple shapes, the assembled sandwich is prepressed prior to final lamination by passing the assembly between a nipper roll assembly, a typical one being described and claimed in U.S. Pat. No. 3,351,001 to Aachio.

In fabricating a bilayer windshield comprising a single glass sheet and a polyurethane layer, a glass sheet with an adhesion promoting composition or coupling agent applied where desired to a major surface thereof, is assembled with the coated surface facing the polyurethane sheet and another glass sheet having a parting material applied to a major surface thereof having its coated surface facing the other surface of the polyurethane sheet.

The parting material is preferably an organic silicon composition well known for parting material properties, such as an organic silicon coating produced by applying a liquid organic silicon composition to a glass surface and drying, then heating the coated glass surface for sufficient time (24 hours) at a temperature sufficiently high (250°F) to cure the coating. The initial coating composition may comprise an organopolysiloxane compound produced by the hydrolysis and condensation of at least one compound having the formula: $T_nSiZ_{(4-n)}$ wherein T independently generally represents a member such as alkyl, alkenyl and aryl, more specifically, methyl, ethyl and propyl through hexyl (both normal and isomeric forms), cyclopentyl, cyclohexyl, vinyl and the normal isomeric forms of propenyl through hexenyl and phenyl; Z independently represents a hydrolyzable group, more specifically a halogen (chlorine, bromine, fluorine and iodine), alkoxy (e.g., methoxy through heptoxy) and acyloxy (e.g., acetoxy, propionoxy, butyroxy, pentanoxy, hexanoxy, etc.) and aryloxy, e.g., phenoxy; and $n$ is a positive integer of less than 4 and preferably one. Preferred organosiloxane compositions adapted for use as inital coating compositions to be cured consist essentially of a solvent solution of alkoxysilane or a solution of a mixture of methyltrialkoxysilane and phenyltrialkoxysilane in which the alkoxy group contains less than five carbon atoms. The curable organopolysiloxane compositions and their methods of preparation are disclosed in U.S. Pat. No. 3,451,838 to Alfred J. Burzinski et al and in U.S. Pat. No. 3,460,980 to Alfred J. Burzinski. Other suitable parting materials are disclosed in U.S. Pat.

Nos. 3,002,946 to Thomas (phenyl methyl siloxane resin compositions) and U.S. Pat. No. 3,015,637 to Rauner and Tyler (organo siloxane-alkyl resin coating compositions).

After the two glass sheets are assembled with the adhesion promoter or coupling agent on the surface of the glass sheet facing one surface of the preformed polyurethane sheet and the parting material baked onto the surface of the other glass sheet facing the other surface of the preformed polyurethane sheet, the assembly is wrapped in polyvinyl fluoride plastic and the plastic-wrapped assembly inserted within a so-called "polymar" bag of the type disclosed in U.S. Pat. No. 3,311,517 to Keslar and Rankin. The bag comprises an outer ply of polyethylene glycol terephthalate and an inner ply of polyethylene bonded thereto. The bag is inserted within a second bag of the same material and the bag assembly evacuated and sealed.

The sealed unit is placed in an oil autoclave and subjected to a pressure of 200 pounds per square inch at 275°F. to 300°F. for 45 minutes. The unit is then cooled to room temperature while maintaining the elevated pressure. Then, the pressure is reduced, the unit removed from the autoclave and the bags opened. The glass sheet coated with the parting material is separated from the remainder of the assembly, which consitutes a bilayer laminated assembly comprisng the preformed polyurethane sheet and the glass sheet coated with the adhesion promoting composition or coupling agent.

The bilayer windshield can also be produced by casting into a space maintained between a glass sheet coated on a desired portion of a surface with an adhesion promoting composition or coupling agent and a glass surface coated with a parting material a polyurethane resin of the type described in U.S. Pat. No. 3,509,015 of Wismer, Ammons and Dufala, curing the glass-polyurethane assembly by heating to a temperature between about 200°F. and about 300°F. for at least ½ hour and separating the glass sheet coated with parting material from the resulting glass-polyurethane laminate.

the plastic interlayer or innerlayer material is selected from those material which are flexible, optically transparent and are somewhat abrasion resistant. Further, the plastic innerlayer material, when laminated to the glass sheet to form the windshield of this invention, should minimize the dangers of both lacerative and concussive injuries. To fulfill these latter two requirements, the plastic innerlayer material should be flexible, should have a good tensile strength and should adhere well to the outer glass ply at ambient conditions. The plastic innerlayer should be flexible such that when the windshield is impacted by a passenger's head cracking the outer glass ply, the plastic innerlayer can stretch and act as a diaphragm, thereby absorbing impacting energy and minimizing concussive injury. The plastic innerlayer should have good tensile strength to minimize tearing, thereby providing resistance to penetration of the closure.

Accordingly, the plastic sheeting material should have abrasion resistance as measured by A.N.S.I. code Z 26.1 Test No. 17 for plastics, of no more than 15 percent increase in haze after 100 Taber cycles on a Taber abraser. For flexibility, the plastic innerlayer should have a relatively constant Gehman modulus between about −20° and 50°F. of $10^7$ and $10^{9.5}$ log of 3 times the shear modulus in hynes per square centimeter, as measured according to A.S.T.M. D-1053-65. The plastic innerlayer should have a tensile strength of at least 1000 pounds per square inch, preferably 2,000 to 5,000 pounds per square inch, as measured by A.S.T.M. D-638-64T. For adherence, the plastic innerlayer material should laminate to the glass sheet with a bond strength of 2 to 30, preferably 2 to 10, pounds per linear inch, as measured by the Peel Adhesion Test described previously.

Besides the plastic innerlayer material having the above physical properties, the laminated bilayer vehicle closure of one sheet of glass and a flexible plastic ply should have certain physical properties in the combined laminated configuration. Minimum standards for motor vehicle glazing are determined in accordance with the procedures described in the A.N.S.I. Code z 26.1 tests. Therefore, the laminated bilayer structures contemplated by this invention have the following physical properties when tested according to the procedure set forth in the A.N.S.I. Code Z 26.1 test.

PROPERTIES OF BILAYER OF LAMINATES
PREPARED AS CONTEMPLATED BY THE INVENTION

| A.N.S.I. Code Z 26.1 Test Number | Property Measured | Result |
| --- | --- | --- |
| 1 | Light Stability | Samples are unaffected[1] by 117 hours exposure to ultraviolet light |
| 2 | Luminous Transmittance | >70% |
| 9 | Impact Strength (Dart) | No penetration |
| 12 | Impact Strength (ball ½ pound) | No penetration |
| 15 | Optical Deviation and Distortion | Not observable at specified normal angle of incidence |
| 26 | Penetration Resistance[2] | No penetration |

[1] Samples did not visibly yellow nor lose visible transmittance.
[2] Test slightly modified by clamping the bilayer structure to the frame when the plastic side was impacted.

Plastic innerlayer compositions which have been found to possess the above characteristics are polyurethane resins, both thermoplastic and thermosetting type, with the thermoplastic type being preferred. Thermoplastic polyurethanes are available as preformed sheets, whereas the thermosetting polyurethanes are preferably cast as a liquid against a glass sheet and cured in place while held in such a relation to the glass.

The polyurethane materials are particularly useful because of their flexibility and good tensile properties. Further, they are transparent, have good abrasion resistance, are impervious to atmospheric conditions and maintain a strong laminate bond with the glass for indefinite periods of time. By thermosetting-type polyurethane is meant one in which there is cross-linking among polyurethane chains. Such cross-linking occurs, for example, in the curing of so-called polyurethane "prepolymers," which are linear, isocyanate-terminated polycarbamate esters of a diisocyanate and a diol, with a tri-functional curing agent such as a glycol having three or more hydroxyl groups and/or a polyamine having three or more amino groups. A thermoplastic polyurethane is one which contains only substantially linear polyurethane chains with essentially no, or only minimal, cross-linking among the chains.

The thermoplastic polyurethanes flow under the influence of heat and pressure and can be therefore extruded or calendered in sheet form. The thermosetting polyurethanes, on the other hand, because of the cross-linking among the individual polymer chains, do not flow well under the influence of heat and pressure, and if extruded or calendered, have extrusion lines and roll marks from calendering. The lines and roll marks cause distortion and haze in the transparent plastic, making them unacceptable for bilayer motor vehicle windshield applications. Thus, thermosetting polyurethanes must be either cast as a liquid and cured in place against the outer strengthened glass, or precast in an environment which gives a preformed sheet with uniform thickness and no optical distortion. Such techniques are described below.

Polyurethanes of the thermosetting type used in this invention are described in U.S. Pat. No. 3,509,015, the disclosure of which is incorporated by reference, and are typically the reaction product of an organic polyisocyanate and a glycol, which is cross-linked with an organic compound having at least three active hydrogen atoms. Preferably, an isocyanateterminated "prepolymer" which is formed from the reaction of an organic polyisocyanate and a glycol is first formed. This "prepolymer" forms one package of a two-package system. The curing agent forms the other package. Immediately before use, the two packages are mixed.

The preferred thermoplastic types of polyurethanes are prepared by reacting an organic polyisocyanate which a long chain glycol and a compound containing two active hydrogen atoms per molecule reactive with the isocyanate groups. Reaction is conducted until a solid, but still thermoplastic material is obtained. Then the reaction is interrupted, and the plastic is extruded, calendered or pressed into a sheet. Thermoplastic polyurethanes and manufacturing techniques are described in Belgian Pat. No. 785,125, assigned to the assignee of this invention, the disclosure of which is herein incorporated by reference.

Other polyurethanes used in the laminated windshields of the present invention are prepared by polymerizing a polycaprolactone, e.g., epsilon-caprolactone, with an aliphatic diol, e.g., 1,4-butane diol. Still other polyurethanes based on polycarbonate diols rather than polycaprolactone and other polyester diols may also be used in the laminated windshields of the present invention. Belgian Pat. No. 792,203 discloses suitable polyurethanes prepared from polycarbonate diols and their method of preparation.

Thus, for example, the organic polyisocyanates that can be employed are the various organic compounds containing two or more isocyanato groups, or mixtures of such compounds, including aromatic, aliphatic and cycloaliphatic diisocyanates and tri-isocyanates and combinations of these types. Examples of various organic polyisocyanates which can be used in making the thermoplastic polyurethane are those described above for use in making the thermosetting type of polyurethanes. Preferred organic polyisocyanates are dinuclear cyclic aliphatic diisocyanates, such as 4,4'-isopropylene-bis(cyclohexyl isocyanate) and 4,4'-methylene-bis-(cyclohexyl isocyanate). The latter being commercially available in a 55:45 (percent by weight) trans:cis stereoisomer mixture from du Pont Chemical Company under the trademark HYLENE W.

The long chain glycol used in making the thermoplastic polyurethanes are hydroxy-terminated polyesters having a molecular weight of from about 500 to 20,000, preferably about 750 to 5,000 and optimally about 1,000 to 3,300. Herein, molecular weight refers to number average molecular weight.

The hydroxy-terminated polyester is formed by polyesterifying a polycarboxylic acid and a polyhydric alcohol. Since the polyesters are hydroxy-terminated, they should be prepared such that there is an excess of polyol to polyacid. Preferably, a molar ratio of more than one polyol to polyacid should be used. Reaction conditions for polyesterifications which include time, temperature, ratio of ingredients and catalyst usage are well known in the art and can be found in the following references: *Unsaturated Polyesters Structures and Properties* by H. V. Boenig, Elsevier, New York 1964 and *Polyesters and Their Application*, Bjorksten Research Laboratories, New York, Reinhold 1956.

The hydroxy-terminated polyesters used in making the thermoplastic polyester polyurethanes are preferably the esterification products of an aliphatic dibasic acid or anhydride with an aliphatic diol. Suitable aliphatic dicarboxylic acids are alkylene dicarboxylic acids having 4 to 14 carbon atoms in which the alkylene radical may be, for example, adipic, succinic, pimelic, suberic, azelaic or sebacic moieties. Besides the saturated species, unsaturated dicarboxylic acids or anhydrides such as maleic acid, maleic anhydride, fumeric acid and itaconic acid can also be used.

The aliphatic diols are preferably saturated and contain from 2 to 15 carbon atoms. Examples include ethylene glycol, 1,3-propane diol, and 1,4-butane diol.

The preferred hydroxy-terminated polyester is poly-1,4-butylene adipate having a molecular weight of from about 1,000 to 3,300.

Besides the hydroxy-terminated polyesters, the organic polyisocyanates also react with an additional compound containing at least two active hydrogen atoms as determined by the Zerewitinoff test, which is described in the Journal of the American Chemical Society, Volume 49, page 3181 (1927).

The compounds containing the active hydrogen groups which are reactive with the isocyanate moieties preferably contain only two active hydrogen atoms and are the aliphatic diols containing from about 2 to 15 carbon atoms inclusive. Examples include a saturated aliphatic diol such as ethylene glycol, 1,3-propane diol, and 1,4-butane diol.

Besides the preferred aliphatic diols, amine or amine-diol mixtures which contain at least two, and preferably only two, active hydrogen atoms per molecule can be used as the active hydrogen-containing compound.

The amines which can be employed can be primary or secondary diamines in which the radicals attached to the nitrogen atoms can be saturated and unsaturated aliphatic or alicyclic radicals. Also, the radicals can be aromatic, aromatic-substituted aliphatic, aliphatic-substituted aromatic ro heterocyclic radicals can also be employed. Examples of suitable aliphatic and alicyclic diamines are the following: 1,2-ethanediamine, 1,3-propanediamine, 1,4-butanediamine, diaminopropyltetramethylenediamine, and isophoronediamine.

Aromatic diamines such as the phenylene diamines and the toluene diamines can be employed. Exemplary of the aforesaid amines are: m-phenylenediamine and p-tolylenediamine.

The thermoplastic polyurethanes can be prepared in several ways. The so-called "prepolymer method" offers selective control of the polymerization steps. By this method, the polyester is first reacted with an excess of diisocyanate to give an intermediate molecular weight adduct or "prepolymer." The prepolymer can then be polymerized (chain-extended) with diols, diamines or other active hydrogen compounds. Some minimal cross-linking can be tolerated by the use of a minor portion of some triol or other trifunctional material in the curing step. If the thermoplastic polyurethane is to be extruded into sheet form, the amount of cross-linking should be minimal since cross-linking will inhibit the polymer from flowing under the heat and pressure of extrusion. As a consequence, extruding a polyurethane with substantial cross-linking will result in an optically distorted sheet.

In addition to the prepolymer route where the reaction of isocyanate with polyester is completed before the active hydrogen compound (alternatively referred to herein as "curing agent") is added, all components may be mixed simultaneously in a so-called "one-shot" process. This method is generally satisfactory when all active hydrogens react at about the same rate such as when all contain hydroxyl groups as the only reactive sites. When a diamine active hydrogen curing agent is included, however, the procedure is usually successful only if special catalysts are added to selectively catalyze the reaction with hydroxyl groups so that their reactivity becomes similar to that of the amine groups. Otherwise, the diamine reacts first forming a polyurea which separates from the reaction mixture. Particularly useful catalysts are the tin catalysts such as dibutyltin dilaurate and stannous octoate.

For optimum results, the water content of the hydroxyl-terminated reactants should be as low as possible, since the isocyanate moieties are moisture sensitive.

The isocyanate reaction should generally be conducted under anhydrous conditions with dry reactants, such as in a nitrogen atmosphere, at atmospheric pressure and at a temperature of between about 70°C. and about 200°C. The reaction is conducted until there is essentially no free isocyanate or hydroxyl groups (i.e., less than about 0.7 percent and preferably less than 0.3 percent by weight NCO).

Catalysts, although not required for all reactions are preferably employed such as, for example, the aforementioned tin catalysts, dibutyl tin dilaurate and stannous octoate. Ultraviolet radiation absorbers, such as 2,4-dihydroxy benzophenone or a substituted benzotriazole sold commercially by Geigy Chemical Corp. under the trademark TINUVIN are preferably employed for the aromatic diisocyanates but are generally not required for the more stable aliphatic diisocyanates. Thermal stabilizers may be required for some of the compositions such as, dilauryl thiodipropionate and the hindered phenols.

The processing conditions which may be used and the final polymer properties will govern the choice of curing agent. When the "prepolymer" method is employed, the "prepolymer" is preferably heated to a temperature which will be above the melting point of the curing agent and which will reduce the prepolymer viscosity to a few hundred or at most a few thousand centipoises so as to aid in mixing and prevent solidification of the curing agent. The curing agent is usually heated above its melting point also. The mixing of the prepolymer with curing agent is a critical step and the agitation should be excellent.

Similar or superior results can be obtained by the "one-shot" method if the exotherm is properly controlled and if the relative rates of reactions of all components are adjusted to be nearly the same. Otherwise, a catalyst must be employed.

After reaction is substantially complete, the polymer is preferably transferred directly to an extruder and extruded and/or milled and calendered to the desired thickness or the partially polymerized material can be further polymerized in the forming equipment. When it is not possible to make a direct transfer from the reaction apparatus to the forming apparatus, the polyurethane material can be poured into trays and the like and allowed to harden into blocks. The trays are preferably coated with an extruded sheet of the same urethane material so that the polymer does not adhere to the tray, or removal is sometimes difficult. Suitable coating materials are halogenated hydrocarbons, such as halowax and polytetrafluoroethylene, sold commercially by du Pont under the trademark TEFLON. The polymer can then be processed when desired; and, where the processing requirement requires smaller pieces, the polymer is preferably cut while warm to permit the polymer to be more easily cut and cooled to make granulation easier. Conventional rubber mills, calendering rolls such as described in U.S. Pat. No. 2,156,584, and extruders can be employed to form the polymer into sheet form. The material is then preferably sandwiched between a non-adherent protecting material, such as polyethylene, to exclude dust and preferably sealed in a container to exclude moisture. It may be desirable to coat the polymer with a powder such as sodium bicarbonate in order to prevent adjacent sheets from adhering to each other. Before use in a laminate, it is desirable to control the moisture content in the polymer such as by drying in an oven at a temperature of between about room temperature and about 120°F. for from a few hours up to about 3 days or more. Before lamination, the powder, if employed, can be removed in a water bath, and the sheet dried. The polyurethane can then be placed with other materials to form the desired laminate.

Preferably, the preformed polyurethane sheet used is composed of a polyurethane composition of the type disclosed in Belgian Pat. No. 785,125. The polyester polyol comprises a polymer having a numerical excess of linkages over the total of any other nonhydrocarbon linkages contained therein and having a pair of groups reactive with isocyanate or isothiocyanate groups, said polymer having an average molecular weight between about 500 and about 20,000; a diisocyanate, diisothiocyanate or compound containing at least two active hydrogens per molecule reactive with isocyanate or isothiocyanate groups having a molecular weight of less than about 250, molecular weight again meaning number average molecular weight.

EXAMPLE I

Preformed sheets of polyester polyurethane are prepared for use in safety glass windshields as follows:

One mole of poly(1,4-butylene adipate) polyester having a molecular weight of 2000, a hydroxyl number of 57.1 and an acid number of 0.5 is dried while agitated in a glass reactor to remove trace amounts of water by heating to 100°–105°C. under 3 millimeters of mercury pressure for about 3 hours. The pressure is released while introducing pre-purified nitrogen and 2.74 moles of 1,4-butanediol is added over a one minute period to the agitated mixture of dried polyesters at 93°C., and the mixture heated to 95°C. in 15 minutes. The resulting mixture is homogeneous. To this homogeneous mixture is added over a one minute period 3.74 moles of 4,4'-methylene-bis-(cyclohexyl isocyanate) with a stereoisomer content of 19 to 21 percent trans, trans, 17 to 18 percent cis, cis, and 62 to 64 percent cis, trans, and containing between 0.27 percent and 0.40 percent monoisocyanate, (Hylene W) containing 0.01 percent of the total reactants of dibutyltin dilaurate catalyst. The butanediol and diisocyanate are at 22°C. and the additions are both made while the reactor is under a nitrogen atmosphere. The resulting mixture is rapidly agitated for about one minute during which time the temperature of the mixture rises from 80°C. to 95°C. The mixture is poured into a dry TEFLON coated reactor which is closed and placed in a 130°C. non-circulating continuous purged nitrogen oven (the temperature of the polymer was approximately 143°C.) for about 2 hours until the reaction and polyurethane formation is substantially complete. The resultant semi-solid polymer is allowed to cool to room temperature, removed, cut and milled (front roll 180°F. and rear roll 135°F.) and calendered on a 3 roll mill (top roll 250°F., middle roll 225°F. and bottom roll 215°F.) into sheets 30 mils thick. The polymer has an inherent viscosity at 30°C. at a 0.5 percent concentration in N-methyl-2-pyrrolidone of about 1.40 before milling and an NCO content of 0.07 percent. The inherent viscosity after calendering is approximately the same (1.41). The polymer is cut into rectangular sheets having an area sufficient to be trimmed to an outline conforming to that of the glass sheets to which it is to be laminated, and after storage at 70°F. and a maximum of approximately 20 percent relative humidity, the sheets are assembled between two glass sheets of matching curvature.

Adhesion promoting compositions or coupling agents useful in the practice of this invention can be selected from the well-known class or organo silanes which promote the adhesion of various resinous materials, particularly polyurethanes, to glass. These coupling agents are organo-functional silanes which possess two different kinds of reactivity. The silicon portion of the silanes has an affinity towards glass and the organic portion which is a stable graft onto the silicon atom has an affinity for the polyurethane resin. The main function of the silanes is to provide a stable bond between the glass and the polyurethane under high humidity and high temperature conditions. The silane compounds useful in the practice of this invention have the following general structural formula:

$$(R)_m - Si - (X)_n$$

wherein $m$ plus $n$ is equal to 4 and preferably $m$ is equal to 1 and $n$ is equal to 3. X represents a moiety which can hydrolyze to yield a hydroxyl group. Examples include chloro groups and groups represented by the formula OR wherein R' can be any aliphatic hydrocarbon radical of less than 5 carbon atoms such as memhyl, ethyl, isopropyl, butyl, vinyl or allyl or any acyl radical of less than 5 carbon atoms such as formyl, acetyl or propionyl.

R represents organic moiety which is a stable graph onto silicone and is selected from the class consisting of alkyl containing from 1 to 5 carbon atoms, such as methyl, ethyl, normal propyl, and amyl; vinyl such as ethenyl and propenyl; aryl such as phenyl.

Preferably R is a normal-propyl derivative having the following structure:

$$R''''CH_2 - CH_2 - CH_2 -$$

wherein R'''' is equal to ethyl acryloxy, methacryloxy, glycidoxy, amino, n-bis(beta-hydroxyethyl)amino, N-bis(aminoethyl)aminopropyl and chloropropyl.

Also preferred are silanes in which R contains an epoxy moiety. In this instance R in the above structural formula would be equal to:

wherein R''' is a divalent hydrocarbon radical of less than 10 carbon atoms or a divalent radical of less than 10 carbon atoms composed of C, H and O atoms, the last being in the form of ether linkages.

Examples of suitable silane compounds including the following: vinyl trichlorosilane, vinyl triethoxysilane, vinyl-tris(beta-methoxyethoxy) silane, gamma-methacryloxypropyltrimethoxy-silane, beta-(3,4-ethoxycyclohexyl)-ethyltrimethoxysilane, gamma-glycidoxypropyltrimethoxy-silane, vinyl-triacetoxysilane, gamma-aminopropyltriethoxysilane, n-bis(beta-hydroxyethyl) gamma-aminopropyltriethoxysilane, N-beta-(aminoethyl)-gamma-aminopropyl-trimethoxysilane, methyl trimethoxysilane, ethyl triethoxysilane, amyl triethoxysilane, ethyl trichlorosilane, vinyl triacetoxysilane, and gamma-mercaptopropyl-trimethoxysilane, with gamma-glycidoxypropyltrimethoxy silane being preferred.

Suitable adhesion promoting compositions or coupling agents available commercially include gamma-aminopropltriethoxysilane sold by Union Carbide Corporation under the trademark "A-1100," and N-(beta-amino-ethyl)gamma-aminopropyltrimethyoxysilane sold by Union Carbide Corporation under the trademark "A-1120" and Dow Corning Corporation under the trademark "Z-6020". Another suitable product sold by Dow Corning Corporation is glycidoxy-propyl-trimethoxysilane sold under the trademark of "Z-6040" and still another suitable primer or coupling agent is a 5 percent solution of a reactive silane in a mixed solvent of toluene, butyl acetate and butyl cellosolve sold under the trademark "AP-134" by Union Carbide Corporation.

A typical procedure for preparing and applying an adhesive promoting composition or coupling agent is as follows: A solution is prepared by slowing adding at room temperatue N-(beta-amino-ethyl)gamma-aminopropyl trimethoxysilane (Union Carbide A-1120) to a solvent which is a 50 weight percent mixture of isopropanol and water while stirring the solvent. Adding the silane too rapidly or adding without stirring must be avoided to avoid polymerization of the silane. The resulting solution is applied to the peripheral portion of one or more glass sheets to be laminated by brushing or swabbing to form a frame ½ inch to 2 inches wide. The coating is allowed to dry for 15 minutes at least at ambient conditions. The glass sheet is then ready for assembly and lamination to a preformed plastic sheet. Experience indicates that a solution containing 1 percent by weight of silane "A-1120" produces stronger adhesion than a solution containing 30 percent by weight of said silane.

Two sets of laminates consisting essentially of two float glass sheets 12 inches × 12 inches by approximately ⅛ inch laminated to a preformed sheet of polyurethane 0.030 inch thick were prepared. One set, the control set, did not include an adhesion promoting composition or coupling agent. The other set, the test set, incorporated a frame of adhesion promoting composition or coupling agent prepared by adding "A-1120" slowly to a solvent of equal parts by weight of isopropanol and water and applied to form a border 1 inch wide along the surfaces of the glass sheets facing the preformed polyurethane sheets.

One half of each set was exposed to an accelerated weathering test involving 6 hours immersion in boiling water. The other half of each set was subjected to 2 weeks exposure at 100 percent relative humidity and 120°F. All the control laminates showed edge separation. All the test laminates retained good edge lamination after this accelerated testing program.

Another pair of sets of three trilayer laminates each similar to the previous sets were exposed to the environment in Florida for 3 months. Again, the control set showed results inferior to the laminates in the test set, because one of the three control laminates developed edge delamination of about one inch wide and eight inches long, whereas the other laminates showed no such edge separation.

Another test involved four bilayers, each of ⅛ inch thick float glass laminated to a sheet of preformed polyurethane 0.030 inch thick. Two bilayers had no adhesion promoting composition or coupling agent between the glass and the polyurethane sheets and two bilayers had a 2 inch wide frame of "A-1120" applied to the glass-glass sheet. There was total loss of adhesion in the two bilayers without any adhesion promoting composition after 2 weeks of exposure to 100 percent relative humidity and 120°F. while the two bilayers containing the adhesion promoting composition or coupling agent showed no delamination after three weeks of such exposure.

The above tests showed that so-called edge priming — the application of an adhesive promoting composition or coupling agent to the marginal edge portion of an interfacial surface — improves the adhesion retention properties of both bilayer and trilayer types of laminated glass.

Figure 4:
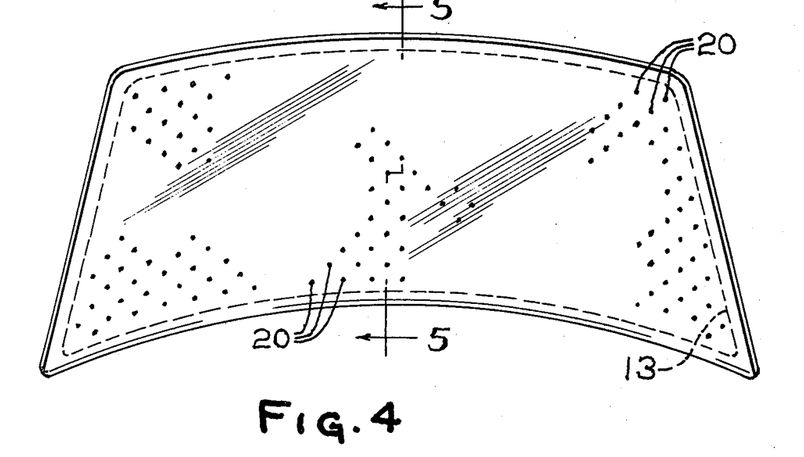
FIG. 4 is a front view similar to FIG. 1 of an alternate embodiment of the present invention.
Figure 5:
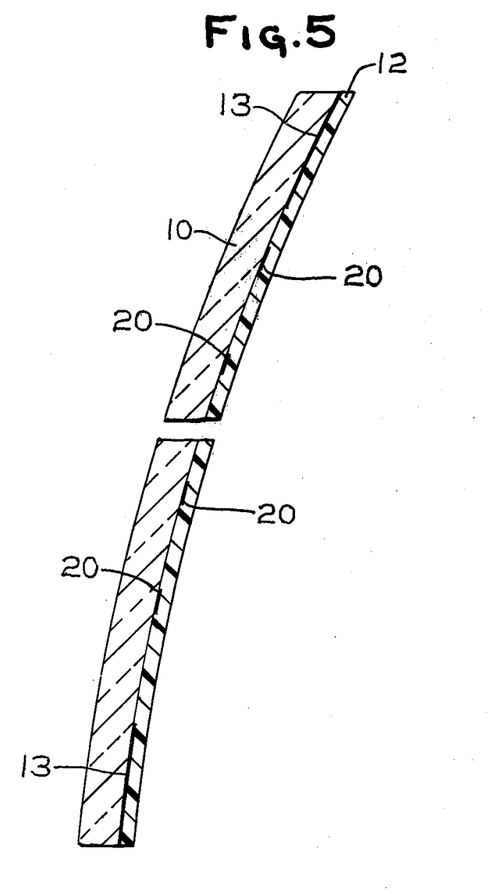
FIG. 5 is a fragmentary, enlarged, sectional view of the FIG. 4, embodiment similar to the view of FIG. 2.

A further embodiment of this invention involves the application of an adhesive promoting composition or coupling agent to the portion of a bilayer or trilayer windshield within the marginal portion. FIGS. 4 and 5 are views of a bilayer windshield similar to those of FIGS. 1 and 2, except that they show another embodiment of the present invention. The embodiment of FIGS. 4 and 5 contains a pattern of dots 20 of an adhesion promoting composition or coupling agent applied to the major surface of the glass sheet that faces the interlayer 12. It is understood, of course, that this aspect of the invention is also suitable in trilayer windshields merely by adding an inner glass sheet 11 and covering the glass sheet 11 with dot pattern 20 over the surface facing the polyurethane sheet 12.

While dots are generally considered to be small circles, it is understood that the term "dot" as contemplated for use in the present invention includes any small area of adhesion promoting composition or coupling agent of any shape, non-circular as well as circular. The area of the "dot" must be small enough to limit the total area of the "dots" to no more than 15 percent of the area of the dot pattern. Also, adjacent dots should be separated by no more than 2 inches.

While the surface of either sheet that forms the interface to be dot primed may be coated with a pattern, it is preferred to coat the rigid sheet or sheets of the assembly to be laminated. The method presently preferred is to cover a glass sheet with a thin, perforated rubber sheet whose apertures are arranged in the desired pattern to provide a template, the adhesion promoting composition or coupling agent is applied in solution form similar to the solution used to coat the marginal edge portion by spraying the solution over the template so that the adhesive promoting composition or coupling agent is applied to the glass surface in the desired dot pattern. The marginal and dot patterns may be applied simultaneously by using a thin perforated sheet smaller than and similar in outline to the glass sheet and applying the adhesive promoting composition or coupling agent when the perforated sheet is properly aligned within the glass sheet. The dot pattern composition is allowed to dry before assembling the sheets to be laminated. The marginal pattern, however, need not be thoroughly dried before said assembly.

A bilayer windshield comprising a polyurethane sheet 0.030 inch thick and a float glass sheet ⅛ inch thick having spots of "A-1120" adhesive promoting composition or coupling agent on 2-inch centers was tested by sled impact at 25 miles per hour. This test produced a laceration rating of 2 and a Severity Index of 944.

Another test was performed comparing bilayer glass-polyurethane windshields with a dot pattern of adhesive promoting composition or coupling agent "A-1120" applied in a solution of 1 percent concentration in dots 3/32 inch in diameter spaced ¼ inch apart with other bilayer windshields containing a continuous coat of adhesive promoting composition or coupling agent "A-1120" applied at 1 percent and 30 percent concentrated solutions, bilayer windshields without any adhesive promoting composition or coupling agent and control trilayer windshields containing polyvinyl butyral interlayers. Each laminate of 0.030 inch thick polyurethane and 3/32 inch thick float glass was impacted at 70°F. with a 22 pound headform. Those results marked "P" in the table below indicated that the headform penetrated the laminate. Other numbers indicate Severity Index values at the impact velocities listed.

| Adhesion Control | 18.9 mph | SEVERITY INDEX 25 mph | 28 mph | 30 mph |
|---|---|---|---|---|
| None | 129 | 272 | | 382 |
| 1% A-1120 Dot Pattern | 160 | 274 | 407 | P |
| 30% A-1120 Continuous Coat | 146 | P | | |
| 1% A-1120 Continuous Coat | P | | | |
| Control Polyvinyl Butyral Trilayer | 140 | P | | |

A continuous coating of adhesion promoting composition or coupling agent tended to inhibit plastic stretching during impact and lowered the penetration resistance. Bilayers with no adhesion promoting composition or coupling agent lose their adhesion retention properties with time. Glass-polyurethane bilayers with the dot pattern of adhesive promoting composition or coupling agent showed such superior penetration resisting results compared to conventional trilayer polyvinyl butyral laminates that further investigation was warranted.

The next test was conducted at various temperatures using impacts at 18.9 miles per hour. Polyurethane bilayers were prepared with a dot pattern of adhesion promoting composition or coupling agent and a continuous layer of adhesive promoting composition or coupling agent. In the next chart, the term "Trilayer" indicates a windshield containing 2 float glass sheets each 3/32 inch thick and a polyvinyl butyral interlayer 0.030 inch thick, "Temp" means the temperature at impact, "H" means the windshield held the headform and "P" indicates the headform penetrated the windshield, the number under "Tear" indicates the length of tear in inches, "SI" indicates Severity Index, "No Primer" indicates a glass-polyurethane bilayer windshield with no adhesion promoting composition or coupling agent between the glass and polyurethane and "Dot Pattern" indicates a dot pattern of adhesion coating composition or coupling agent composed of 3/32 inch diameter dots spaced ¼ inch apart.

| Configuration | Temp. | H/P | Tear | SI | Mean Penetration Velocity (mph) |
|---|---|---|---|---|---|
| Dot Pattern | 70°F | H | 0 | 177 | 31 |
| Dot Pattern | 70°F | H | 0 | 165 | 31 |
| No Primer | 70°F | H | 1 | 149 | 28 |
| Trilayer | 70°F | H | 2 | 150 | 21 |
| Dot Pattern | 110°F | H | 1 | 111 | |
| No Primer | 110°F | P | — | — | |
| Trilayer | 110°F | P | — | — | |
| Dot Pattern | 30°F | H | 0 | 258 | |
| No Primer | 30°F | H | 0 | 296 | |
| Trilayer | 30°F | H | 6 | 234 | |

Another series of tests were performed at 25 miles per hour impact on additional glass-polyurethane bilayer windshields having a dot pattern of adhesion promoting composition at various temperatures. There was no tear of the plastic layer at any of these tests. The following are Severity Index values at the indicated impact temperatures.

| Temperature | Severity Index |
|---|---|
| 70°F | 211 |
| 70°F | 228 |
| 30°F | 264 |
| 110°F | 113 |

This test confirmed the earlier finding that the dot pattern provides a secure bond yet does not severly impair the impact performance.

Further testing of glass-polyurethane bilayer laminates 24 inches by 36 inches performed using the 22 pound headform to impact the laminates at 70°F. and 18.9 miles per hour after 5 months of storage. Bilayer laminates having different adhesion levels and produced at laminating temperatures of 275°F. and 300°F. were compared for Severity Index to each other and to control trilayer laminates containing polyvinyl butyral interlayers.

| Adhesion Control | SEVERITY INDEX 275°F. Cycle | 300°F. Cycle |
|---|---|---|
| None | 228 | 232 |
| | 228 | |
| 1% A-1120 Dot Pattern | 213 | 233 |
| 30% A-1120 | 211 | 272 |
| | 189 (7 inch tear) | 248 (6½ inch tear) |
| Trilayer | 155 (4 inch tear) | |

The following tests using the 5 pound ball impact show how the REA penetration resistance of the bilayers at various temperatures is impaired by applying an adhesion promoting composition or coupling agent throughout the interfacial surface. In the following table, the term "Primed" means adhesion promoting composition or coupling agent included throughout the interface whereas "Control" means an otherwise identical bilayer without the adhesion promoting composition or coupling agent. Also, the peel adhesion is expressed in pounds per linear inch.

| Type of Laminate | 0°F. | 70°F. | 120°F. | Peel Adhesive |
|---|---|---|---|---|
| Primed | 31±2* | 28±1 | 21±1 | 50 |
| Control | 35±2 | 29±1 | 20±3 | 18 |

*Values include 95% confidence interval

In the windshield sled tests performed at room temperature, primed bilayers had Severity Index values of 638 and 480 compared to 596 and 453 for control bilayers. This indicates that applying an adhesive promoting composition or coupling agent throughout the interface has a weakening effect on the penetration resistance at most temperatures and tends to raise the Severity Index somewhat.

Other tests conducted at various temperatures with a 3.5 pound missile having a pointed nose indicate that dot primed laminates containing a dot pattern of adhesive promoting composition or coupling agent have high penetration resistance velocities than fully primed laminates, but less than control laminates that are unprimed. However, the need to maintain adhesion between the glass and polyurethane when the laminate is exposed to high humidity conditions makes it necessary to incorporate some adhesion promoting composition or coupling agent in the interface between glass and polyurethane. The following table entitled "PENETRATION VELOCITY TO 3.5 POUND MISSILE" shows the average velocity at which the 3.5 pound missile penetrated various laminates tested at various temperatures. The "control" laminates had no adhesive promoting composition or coupling agent, the "dot primed" laminates had the adhesion promoting composition or coupling agent applied in a pattern of dots 3/32 inch in diameter spaced ¼ inch apart and the "fully primed" laminates had the adhesion promoting composition or coupling agent applied throughout the entire extent of the interface.

| PENETRATION VELOCITY TO 3.5 POUND MISSILE | | | |
|---|---|---|---|
| Laminate | 30°F. | 70°F. | 110°F. |
| Control | 27 | 21 | 16 |
| Dot Primed | 25 | 18 | 13 |
| Fully Primed | 23 | 17 | 12 |

The form of the invention shown and described in this specification represents illustrative preferred embodiments and certain modifications thereof. It is understood that priming the marginal portion to provide a barrier against the passage of moisture into the interface or interfacial surfaces of the laminate makes it desirable to have as high an adhesion as possible, preferably in excess of 100 pound per linear inch based on a 30 mil thickness of the polyurethane sheet, whereas the dot pattern of adhesion promoting composition or coupling agent applied throughout the interface inside the margin serves a different purpose, especially for bilayer laminates, namely, to provide a pattern of spots where the adhesion is not affected by humidity conditions, so that the overall average adhesion between the glass and polyurethane sheets in the region of likely impact is at least about 2 pounds per linear inch and not more than about 30 pounds per linear inch even though the adhesion at each dot is more than 30 pounds per linear inch.

Each dot of adhesion promoting composition or coupling agent in the dot primer pattern should be relatively small compared to the space between adjacent dots so that its effect on penetration resistance and Severity Index will be minimized. However, the space between adjacent dots of adhesion promoting composition in the pattern of dots should be small, not in excess of about 2 inches, so that the tendency of the glass to delaminate from the polyurethane under high humidity conditions will be limited to small areas which are less likely to cause severe lacerative injury than larger glass fragments. The portion of the area inside the marginal portion occupied by the dot pattern should be in the range of 1 percent to 15 percent of the window area.

It is understood that various changes may be made, such as using adhesion promoting compositions or coupling agent having different adhesive strengths in the dot pattern from that used in the marginal edge portion or different adhesives for the dot pattern and the marginal edge pattern, without departing from the gist of the invention as defined by the claimed subject matter that follows.

We claim:

1. In a transparent laminated window comprising a sheet of glass and a layer of polyurethane susceptible of having its adhesion to glass impaired by exposure to moisture, the improvement comprising a pattern of an adhesion promoting coupling agent disposed at the interface between said glass and said polyurethane, said pattern covering a portion only of said interface to provide said portion with a strong adhesive bond between said glass and said polyurethane even when exposed to moisture.

2. The improvement as in claim 1, wherein said pattern extends around the marginal edge portion of said window.

3. The improvement as in claim 2, wherein said adhesion promoting coupling agent provides an adhesion of at least 100 pounds per linear inch based on a 30 mil thickness for said polyurethane sheet in said marginal edge portion.

4. The improvement as in claim 1, wherein said pattern comprises a pattern of dots disposed throughout the extent of said interface within the marginal edge portion thereof.

5. The improvement as in claim 4, wherein said pattern of dots provides a minimum adhesion of 2 pounds per linear inch between said glass and said polyurethane based on a polyurethane thickness of 30 mils under high humidity conditions.

6. The improvement as in claim 1, wherein said polyurethane is a preformed sheet.

7. A transparent laminated window comprising a pair of glass sheets, an interlayer of polyurethane susceptible of having its adhesion to glass impaired by exposure to moisture between said glass sheets and an adhesion promoting organosilane coupling agent disposed in the marginal portion only of said laminated window at each interfacial surface between glass and polyurethane of said laminated window to provide said portion with a strong adhesive bond between said glass and said polyurethane even when exposed to moisture.

8. A laminated window as in claim 7, wherein said adhesion promoting organosilane coupling agent is present in an amount sufficient to provide an adhesion of at least 100 pounds per linear inch based on 30 mil thick polyurethane in said marginal portion.

9. A transparent laminated window comprising a pair of glass sheets, an interlayer of polyurethane susceptible of having its adhesion to glass impaired by exposure to moisture between said glass sheets, and means for increasing adhesion in the marginal portion only of said window comprising an adhesion promoting organosilane coupling agent disposed in the marginal portion of each interface of said window in an amount sufficient to provide an adhesion of at least 100 pounds per linear inch in said marginal portion based on a 30 mil thickness for said polyurethane, the adhesion between each glass sheet and said plastic interlayer being between 2 pounds per linear inch and 30 pounds per linear inch in the area of said window inside said marginal portion.

10. A laminated window as in claim 9, wherein said marginal portion has a width in the range of between ½ inch and about 2 inches.

11. A laminated window as in claim 9, further including a pattern of dots of said adhesive promoting organosilane coupling agent disposed inside said marginal portion at each interface of said window.

12. A transparent laminated window comprising a glass sheet and a layer of polyurethane laminated to said glass sheet, said window being subject to delamination under high humidity conditions, and a pattern of dots of an adhesion promoting coupling agent capable of providing an adhesion of at least 2 pounds per linear inch based on a 30 mil thickness of said polyurethane under high humidity conditions disposed at the interfacial surface between said glass and said polyurethane.

13. A laminated window as in claim 12, wherein said dots are spaced from one another by a distance not exceeding 2 inches.

14. A laminated window as in claim 12, further including a pattern of an adhesive promoting coupling agent disposed in the marginal portion of the interface between glass and polyurethane in said window.

15. A laminated window as in claim 14, wherein the adhesive promoting coupling agent is present in said marginal portion in an amount sufficient to provide an adhesion of at least 100 pounds per linear inch based on a 30 mil thickness of polyurethane.

* * * * *